No. 722,459. PATENTED MAR. 10, 1903.
O. SCHAEFER.
TIRE FOR VEHICLES.
APPLICATION FILED NOV. 19, 1901. RENEWED JAN. 13, 1903.
NO MODEL. 2 SHEETS—SHEET 1.
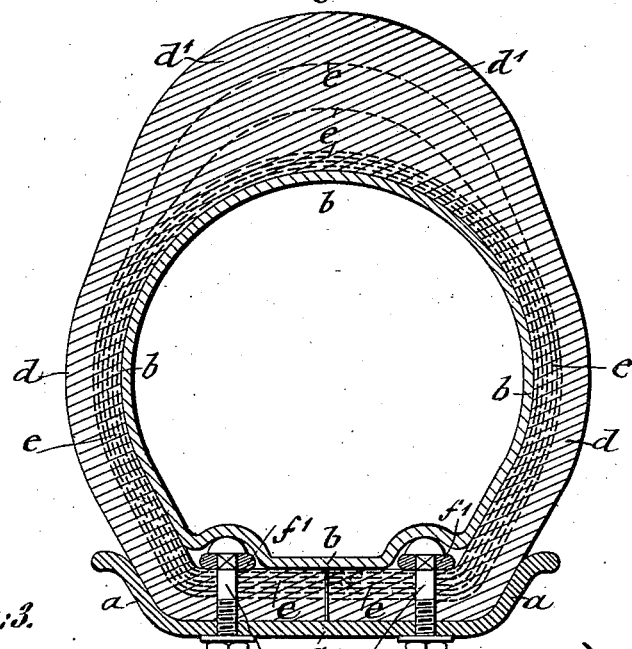
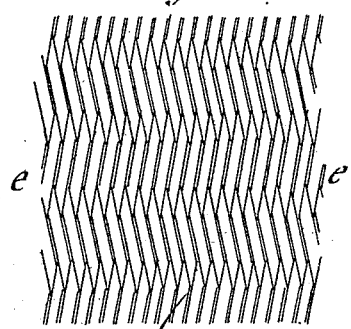
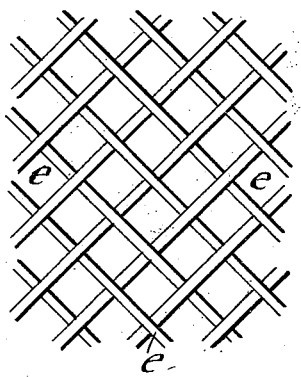
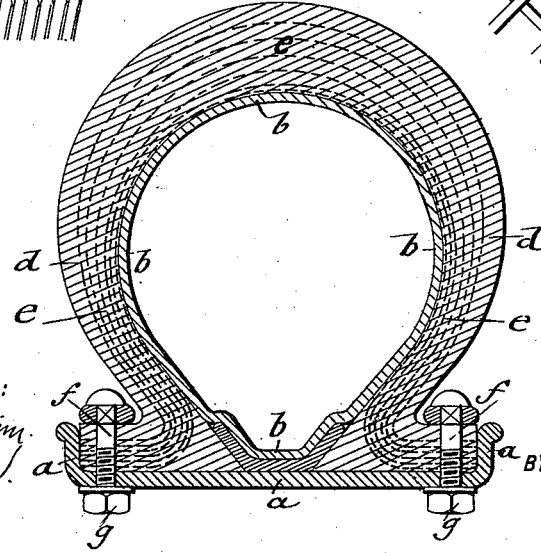
WITNESSES:
INVENTOR
Oscar Schaefer
BY
ATTORNEYS No. 722,459. PATENTED MAR. 10, 1903.
O. SCHAEFER.
TIRE FOR VEHICLES.
APPLICATION FILED NOV. 19, 1901. RENEWED JAN. 13, 1903.
NO MODEL. 2 SHEETS—SHEET 2.
Fig: 5.
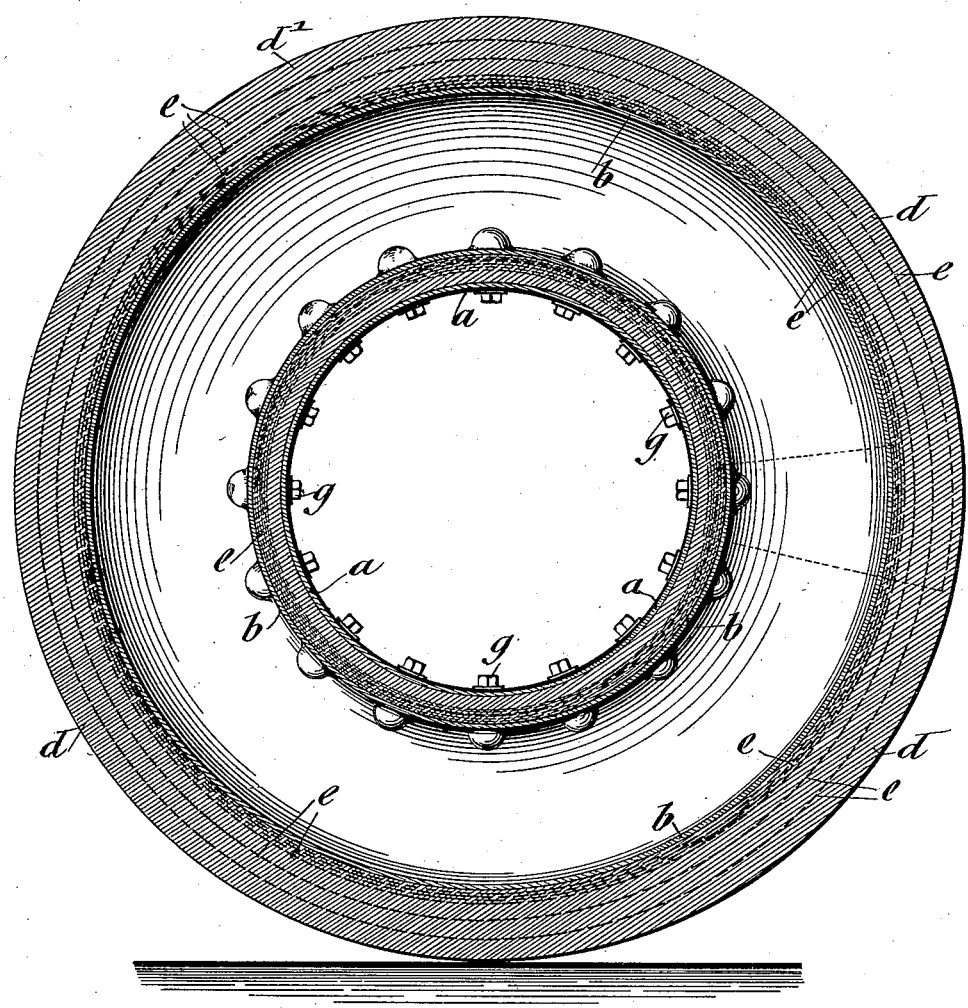

UNITED STATES PATENT OFFICE.

OSCAR SCHAEFER, OF LONDON, ENGLAND.

TIRE FOR VEHICLES.

SPECIFICATION forming part of Letters Patent No. 722,459, dated March 10, 1903.

Application filed November 19, 1901. Renewed January 13, 1903. Serial No. 138,830. (No model.)

*To all whom it may concern:*

Be it known that I, OSCAR SCHAEFER, a citizen of the Empire of Germany, residing in London, England, have invented certain new and useful Improvements in Tires for Vehicles, of which the following is a specification.

This invention relates to pneumatic or elastic solid tires which are specially intended for use in connection with automobiles or other heavy road-vehicles for which a strong and durable tire is required; and the invention consists of a pneumatic or elastic solid tire which is provided with braidings or weavings of fibrous or other material or wire embedded and vulcanized into the tire.

The invention consists, further, in the process of making elastic tires by building up alternating layers of unvulcanized rubber and braidings of yarns or wires and then vulcanizing the same; and the invention consists, further, in treating the yarn employed for the braidings interposed between the vulcanized rubber with ozocerite or other suitable material, so as to protect the yarns against injury during vulcanization without destroying the softness and pliability of the same.

In the accompanying drawings, Figure 1 represents a vertical transverse section of my improved tire, shown as attached to the rim of a vehicle-wheel. Fig. 2 is a vertical transverse section of a modified construction of pneumatic tire. Figs. 3 and 4 represent, respectively, a closely-meshed and a wider-meshed braiding employed in the manufacture of my improved tire; and Fig. 5 is a central section through a complete tire in the plane of the same.

Similar letters of reference indicate corresponding parts.

In making a pneumatic tire according to my invention layers of unvulcanized rubber compound are placed on a circular mandrel alternately with layers of braidings, which are braided on by a suitable braiding-machine. This can be efficiently done by means of special braiding-machines which can be opened out to admit the tire. The tire is gradually built up on the mandrel by means of circular layers of unvulcanized rubber alternating with circular braidings, so that the tire can be made ready for vulcanization without being taken off the braiding-machine. The tire can, however, be made by building continuously a layer of india-rubber and a layer of braiding in a spiral around the mandrel without any joint whatever until the required thickness of tire is obtained—*i. e.*, continuously forming and advancing upon a circular mandrel a tube of unvulcanized rubber and continuously braiding and advancing upon said tube a layer of flexible material, these operations being continued for any desired number of turns of the mandrel until the desired thickness of tire is obtained. The unfinished tire thus formed is then completed by applying an outer covering layer of unvulcanized rubber of any desired thickness and then placing the whole in a suitable mold and vulcanizing said outer covering layer, together with the layers of rubber of the various turns of the tube, into a homogeneous mass. After vulcanization the mandrel is removed by cutting the tire open at its inner periphery or in any other suitable manner. The resulting tire consists of two tubular spirals, one of rubber and the other of braided flexible material, the latter superposed upon the former, each volute upon itself, and the inner within the outer, each turn within the next in direction from the interior toward the exterior of the tire, and each turn of the first or inner spiral connected with the adjacent turns of the same through the second or outer spiral. The tire thus formed is entirely jointless, each turn is united in the most firm and secure manner with the others, and the braiding is under absolutely equal and uniform tension at the outer and inner peripheries. Internal strains and movements are entirely eliminated or, at all events, reduced to a minimum and a most practical, efficient, and durable tire for all kinds of vehicles and one particularly well adapted to resist the driving strains produced in the tires of automobile vehicles is obtained.

To avoid loss of strength of the yarns during vulcanization, the braiding-yarns are impregnated with ozocerite, ceresin, paraffin, beeswax, or similar material. The nature of the braiding permits the laying on of the threads under almost any angle and width of mesh and at a uniform tension, as shown in Figs. 3 and 4, so that the driving strains when the tire is in use are taken up by the various threads of the braiding layers in almost equal proportions, while the intermediate layers of rubber are strained very little, if at all. It is best to build up the tires of alternating layers of unvulcanized india-rubber and braidings, of which the inner braidings are closer together than the outer ones; but in some cases it may be desirable to use closely-woven material for the inner layer or layers immediately surrounding the air-tube and to braid only the outer layers which hold the thicker tread to the pneumatic proper, as this tread has to bear the principal driving strains. The meshes in the braidings immediately surrounding the air-tube will be made smaller than the meshes in the braidings which are nearer to the outer circumference of the tire. In any case the india-rubber, which is placed on both sides of the braidings, will unite through the meshes, so that after vulcanization the braidings and india-rubber will be solidly baked together into one inseparable mass, which is almost if not quite as elastic as if there were no layers of textile material at all embedded in the tire.

The described process of manufacture of the tire can be used with advantage for the production of any tire, though it is of special value for pneumatic tires which have on their outer circumference a thick layer of india-rubber or so-called "tread," as this tread becomes thoroughly united with the pneumatic proper by the intermediate layers of braiding, so that the separation of the tread becomes impossible. Besides this advantage the close union and actual continuity of the various layers of india-rubber through the meshes of the braidings facilitate the conduction and dispersion of heat and prevent the accumulation of the same. Braidings are softer and more pliable than closely-woven canvas, and when the braiding-yarns are impregnated with ozocerite or like substance their softness and pliability is not destroyed by vulcanization. The treatment with ozocerite prevents the drying of the yarns during vulcanization and their consequent loss of strength, which, together with the open-meshed braidings employed, causes less generation of heat during driving than when unimpregnated and closely-woven fabrics are employed. Tires made with such impregnated braidings are therefore softer, more pliable, and less liable to skidding than ordinary pneumatic tires. As the separate threads of the braidings are entirely surrounded by india-rubber and solidly embedded in the same, the outer layer of india-rubber of the tread of the tire may wear away in the course of time to such an extent as to lay bare the outer layer of braiding; but this will have no further consequences than that the braiding wears also and that the next layer of india-rubber becomes the wearing-surface. A separation of the bared layer of braiding, which would invariably occur when layers of canvas are used, is therefore entirely precluded, so that braided tires of the construction described have for this reason a much longer life than ordinary tires.

Solid tires which are made by alternating layers of india-rubber and open braidings produced in the tire itself during the manufacture of the same as a closed ring are stronger and more durable than solid tires made of india-rubber only or solid tires which are made with insertions of textile material, such as closely-woven canvas, as the latter makes the tire too stiff and inelastic and cannot be incorporated into the rubber in such a manner as to be inseparable from it. It is obvious, however, that in place of the inner layers of braidings layers of closely-woven material, such as canvas, can be used in conjunction with exterior layers of india-rubber and braidings; also, that braidings made of wire or metallic strips can be used in place of braidings made from yarns.

The impregnation of the yarns not only preserves the strength, softness, and pliability of the same during vulcanization, but it also insures a more intimate union of the yarns with the india-rubber and prevents the soaking up of moisture by the yarns when the outer tread of india-rubber is worn off and the braiding becomes bare.

When the tire is made on a mandrel and the feet of the same do not require any further shaping, it is vulcanized as a closed tube and cut open along the inner circumference after vulcanization. If the feet of the tire require any special shaping, this must be done before vulcanization. Tires made of india-rubber and braidings can also be manufactured and used as endless closed tubes without cutting them open along their inner circumference. The inner ends or feet of the tire are attached by bolts to the rim of the vehicle-wheel, as shown in Fig. 1, in which *a* represents the rim; *b*, the interior air-tube; *d*, the tire, which is built up from layers of india-rubber and braidings *c*. *d'* is the thickened tread; *f*, the bolts, which are passed through metallic strips *e*, having slotted holes in the inner ends or feet of the tire and of the rim and which are attached by nuts *g*, that are screwed onto the threaded ends of the screw-bolts to the rim. The holes in the metallic strips or bands are preferably elongated or slotted in circumferential direction, so as to enable the bolts to slide in these holes when the tire is stretched for being put on the rim. In cases where the feet of the tire are bent in outward direction the inner edges abut against the flaring sides of a raised band and attached to the rim and slip under the inclined sides, while the outwardly-bent feet are bolted to the rim by metallic strips and bolts in the same manner as the inwardly-bent feet. In the tire shown in Fig. 1 five layers of braidings are shown, which are arranged closely together in the inner portion of the tire, while the two outer braidings are wider apart and pass through the tread and hold the same to the pneumatic proper. In Fig. 2 two braidings are shown close together surrounding the air-tube, while the remaining ones are embedded in the thickened layer of india-rubber which forms the tread.

Having thus described my invention, I claim as new and desire to secure by Letters Patent—

1. The herein-described process of making a vehicle-tire, which consists in applying a layer of unvulcanized rubber to a suitable core or mandrel in the form of a closed ring, braiding upon said layer a plurality of threads in open mesh, said threads being all equally disposed and laid on simultaneously and under a strong and uniform tension at all parts, applying a layer of unvulcanized rubber upon said layer of braiding, continuing said braiding and the application of said layer of rubber until the same overlap the inner end or beginning, cutting off said braided layer or the threads composing the same at a point beyond said inner end, applying a final covering layer of unvulcanized rubber over the mass, and vulcanizing the whole, substantially as set forth.

2. The herein-described process of making a vehicle-tire, which consists in applying a layer of unvulcanized rubber to a suitable core or mandrel in the form of a closed ring, braiding upon said layer a plurality of threads in open mesh, said threads being all equally disposed and laid on simultaneously and under a strong and uniform tension at all parts, applying a layer of unvulcanized rubber upon said layer of braiding, continuing said braiding and the application of said layer of rubber until the same overlap the inner end or beginning, cutting off said braided layer or the threads composing the same at a point beyond said inner end, applying a final covering layer of unvulcanized rubber over the mass, vulcanizing the whole, and removing the mandrel or core therefrom, substantially as set forth.

3. A tire for vehicles, consisting of a body of rubber in the form of a closed ring, said rubber being under uniform tension in all parts, and a strengthening layer of braided material arranged in a single layer and composed of a plurality of threads each intercrossing at an oblique angle and low pitch with the others, the individual threads of said layer being under a uniform tension in all parts and the outer end of said layer overlapping the inner end and separated from the same by an intermediate portion of said body of rubber, which said intermediate portion is connected through the meshes of said overlapping end of the strengthening layer with the outer portion of said body of rubber, substantially as set forth.

4. In a vehicle-tire of vulcanized rubber, a braided open-mesh layer of strengthening-threads of fibrous material impregnated with ozocerite, or similar materials, substantially as set forth.

5. A tire for vehicles, consisting of a tubular body of rubber in the form of a closed ring, said rubber being under uniform tension in all parts, a tubular braiding arranged in a spiral in said body of rubber, and composed of a plurality of threads each intercrossing with the others, the individual threads of said braiding being under a uniform tension in all parts, and the layers of rubber at each side of each layer of braiding being connected with each other through the meshes of said braiding, and a layer or layers of closely-woven material at the inner side of said tubular body of rubber, substantially as set forth.

6. A tire for vehicles, consisting of a body of rubber in the form of a closed ring, said rubber being under uniform tension in all parts, and a braiding arranged in a spiral in said body of rubber and composed of a plurality of threads each intercrossing with the others, the individual threads of said braiding being under uniform tension in all parts, and the layers of rubber at each side of each layer of braiding being connected with each other through the meshes of said braiding, substantially as set forth.

7. A tire for vehicles, consisting of a continuous braiding of suitable material, passed several times around the tire, in the form of a complete spiral, and rubber between and over the individual layers, said tire showing in cross-section a number of layers of braiding alternating with layers of rubber, substantially as set forth.

8. A tire built up of several separate layers of braiding, with rubber between, each braiding layer forming a spiral which overlaps its beginning, and having rubber between starting and finishing end, said tire showing in cross-section a number of layers of braiding alternating with layers of rubber, substantially as set forth.

9. The herein-described process of making a vehicle-tire, which consists in applying a layer of unvulcanized rubber to a suitable core or mandrel in the form of a closed ring, braiding upon said layer a plurality of threads, all of said threads being applied simultaneously and under uniform tension at all parts, applying a layer of unvulcanized rubber upon said layer of braiding, continuing said braiding and the application of said rubber several times around the mandrel, cutting off said braiding, applying a final covering layer of unvulcanized rubber over the mass and vulcanizing the whole, substantially as set forth.

10. The herein-described process of making a vehicle-tire, which consists in applying a layer of unvulcanized rubber to a suitable core or mandrel in the form of a closed ring, braiding upon said layer a plurality of threads, all of said threads being applied simultaneously and under uniform tension at all parts, applying a layer of unvulcanized rubber upon said layer of braiding, continuing said braiding and the application of said rubber several times around the mandrel, cutting off said braiding, applying a final covering layer of unvulcanized rubber over the mass, vulcanizing the whole, and removing the core or mandrel therefrom, substantially as set forth.

11. The herein-described process of making a vehicle-tire, which consists in applying to a suitable core or mandrel in the form of a closed ring, a plurality of alternate layers of suitable fabric and unvulcanized rubber, braiding upon the outer layer of rubber a plurality of threads, all of said threads being applied simultaneously and under uniform tension at all parts, applying a layer of unvulcanized rubber upon said layer of braiding, continuing said braiding and the application of said rubber several times around the mandrel, cutting off said braiding, applying a final covering layer of unvulcanized rubber over the mass, vulcanizing the whole, and removing the mandrel or core therefrom, substantially as set forth.

In testimony that I claim the foregoing as my invention I have signed my name in presence of two subscribing witnesses.

O. SCHAEFER.

Witnesses:
  G. KÜHN,
  W. F. LOTZ.